(No Model.)
H. SEE.
MANUFACTURE OF CRANK SHAFTS.
No. 322,204. Patented July 14, 1885.
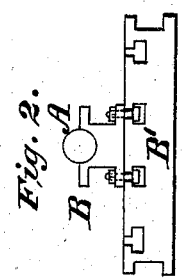
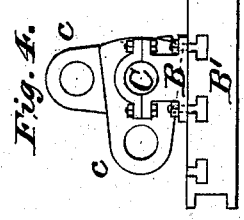
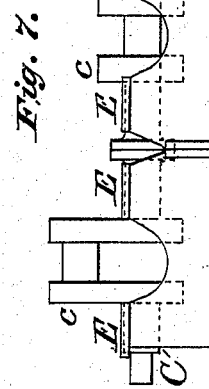
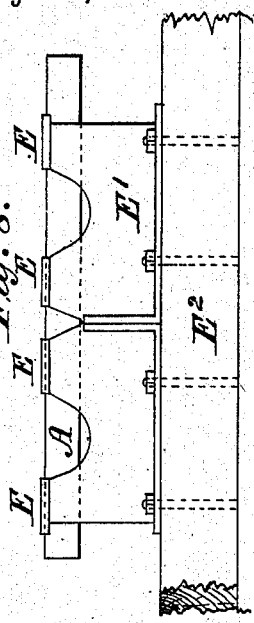
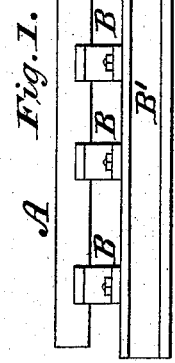
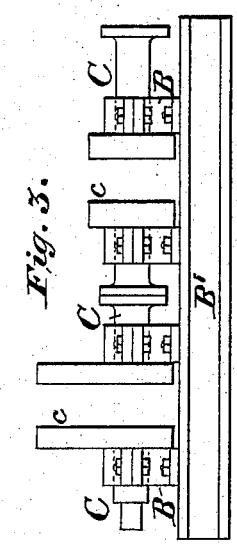
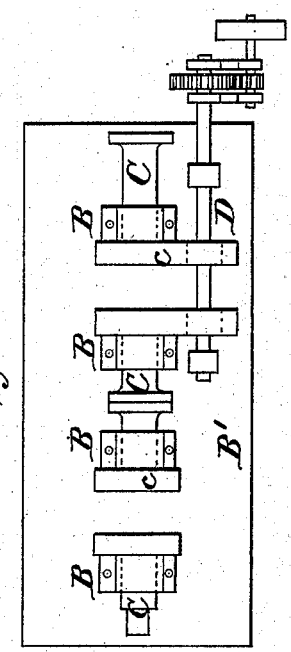
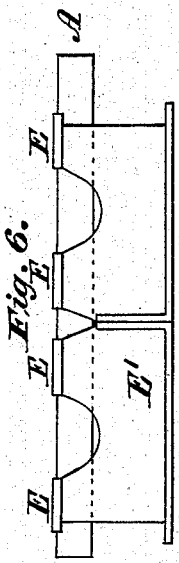
Witnesses:
T. C. Brecht
Geo. B. Collier
Inventor:
Horace See,
by Collier & Bell,
Attorneys.

United States Patent Office.

HORACE SEE, OF PHILADELPHIA, PENNSYLVANIA, ASSIGNOR OF ONE-HALF TO THE WILLIAM CRAMP & SONS SHIP AND ENGINE BUILDING COMPANY, OF SAME PLACE.

MANUFACTURE OF CRANK-SHAFTS.

SPECIFICATION forming part of Letters Patent No. 322,204, dated July 14, 1885.

Application filed August 6, 1883. (No model.)

*To all whom it may concern:*

Be it known that I, HORACE SEE, of the city and county of Philadelphia, in the State of Pennsylvania, have invented certain new and useful Improvements in the Manufacture of Crank-Shafts, of which improvements the following is a specification.

The object of my invention, which is more particularly designed for use in finishing and fitting the large and heavy shafts having two or more pairs of cranks, which are employed in marine steam-engines of the compound type, is to enable the journals and bearings of a crank-shaft, whether said shaft be built or solid, to be brought to a truly cylindrical contour and an axial coincidence, and the crank-pins to be made truly parallel thereto.

To this end my improvements consist in certain novel methods of finishing and fitting a crank-shaft and its bearings, as hereinafter set forth.

In the accompanying drawings, Figure 1 is a side view in elevation of a set of special or adjusting bearings and a truing-mandrel adapted to the practice of my invention; Fig. 2, an end view of the same; Fig. 3, a side view, in elevation, of said bearings with the section of a shaft adjusted therein; Fig. 4, an end view of the same; Fig. 5, a plan or top view of the same, illustrating the boring out of a pair of crank-pin eyes; Fig. 6, a side view of the bed-plate and main bearings of the crank-shaft with the truing-mandrel applied thereto; Fig. 7, a similar view of the same, with the shaft in position and in readiness for the facing off of the couplings, and Fig. 8 a similar view of the same after being secured to its foundation and with the truing-mandrel applied.

To carry out my invention, I provide a cylindrical truing-mandrel, A, the length of which is equal to or somewhat greater than the distance between the outer ends of the two end journals of the crank-shaft to be dealt with, so as to reach over all the bearings thereof, and which is preferably of the same diameter as the journals of said shaft, although, if desired, it may be made of smaller diameter, so as to have adjustable sleeves or collars fitted upon it of diameters corresponding, respectively, with the journals of different crank-shafts manufactured and to be finished and fitted from time to time. I further provide a set of special adjusting-bearings, B, corresponding in number and diameter with the journals of the crank-shaft, and secured, preferably, with the capacity of adjustment longitudinally, upon a stout and truly level bed, B', located in any convenient position upon the floor of a machine-shop or other locality suitable for the application of power and use of tools.

The finishing and fitting of a crank-shaft and its bearings under my invention is effected as follows: The special adjusting-bearings B having been bored out and secured in their proper positions upon the bed B', are made true and in line axially by applying the truing-mandrel A to them and correcting any irregularities or imperfections which may be developed by the use of said mandrel as a cylindrical face-plate. The several sections of the crank-shaft C, with the cranks c shrunk on and keyed in position, are next dropped into the adjusting-bearings B, and are brought truly into line by correcting any irregularities or lack of correspondence that may be found to exist as between their journals and said bearings. A boring-bar, D, having proper boring-cutters and driving-gear, is then set parallel with the shaft in bearings upon the bed B', and the crank-eyes of each pair of cranks are bored out to receive the pin, which is forced in and keyed. The main bearings E of the engine, within which the crank-shaft is to rotate, are bored out and made true and in line axially by the application of the truing-mandrel, as in the case of the special adjusting-bearings before described, after which the shaft is tested and made true, if necessary, by dropping it into the bearings E, which are now used as an external cylindrical face-plate, after which the couplings for connecting the shaft-sections one with the other and with the line shaft may be faced off true by the application of a proper tool while the shaft is revolved in the bearings E. As a final assurance against the possibility of the crank-shaft and its bearings being in any manner out of line when located in operative position, the truing-mandrel A may be again applied to the main bearings E after the line has been run through the same and the engine bed-plate E' has been secured upon the keelsons E² or other foundation upon which it rests when in service. In the event of either of the bearings having been forced out of shape or position in screwing down, it is to be corrected by raising or lowering before the shaft is finally dropped into place.

The several operations above described refer more particularly to the case of a built crank-shaft. Where a solid shaft is to be dealt with, it is, after being turned, tested and made true with its own bearings, after the same have been lined by the truing-mandrel, after which its coupling is to be faced off, as before described.

My invention greatly facilitates the attainment of smooth and accurate working of the crank-shafts of large engines, with the consequent avoidance of heating of journals, undue friction, and liability to breakage, which so frequently arise from the difficulty of properly fitting and lining crank-shafts and their bearings by the means ordinarily practiced heretofore.

The apparatus described and shown herein does not of itself constitute part of my present invention, the same forming the subject-matter of a separate application for Letters Patent by me.

I claim as my invention and desire to secure by Letters Patent—

1. As an improvement in the art of manufacturing crank-shafts, the method of insuring the correspondence of the journals and bearings which consists in testing a set of special adjusting-bearings by the application of a cylindrical truing-mandrel, correcting deficiencies thereby found in said special adjusting-bearings, testing the crank-shaft by applying it to said trued adjusting-bearings, correcting irregularities in the shaft, testing the permanent bearings of the crank-shaft by the application of the truing-mandrel thereto, and correcting deficiences thereby found in said permanent bearings, substantially as set forth.

2. As an improvement in the art of manufacturing crank-shafts, the method of insuring the parallelism of the shaft and crank-pins which consists in testing a set of special adjusting-bearings by the application of a cylindrical truing-mandrel, correcting deficiencies thereby found in said special adjusting-bearings, testing the crank-shaft by applying it to said trued adjusting-bearings, correcting deficiences thereby found in said shaft, and boring out the crank-eyes by a boring-bar adjusted to rotate parallel to the axis of said adjusting-bearings, substantially as set forth.

3. As an improvement in the art of manufacturing crank-shafts, the method of insuring the truth of the shaft-couplings which consists in testing a set of special adjusting-bearings by the application of a cylindrical truing-mandrel, correcting deficiencies thereby found in said special adjusting-bearings, testing the crank-shaft by applying it to said trued adjusting-bearings, correcting deficiencies thereby found in said shaft, testing the permanent bearings of the shaft by the application of the truing-mandrel thereto, correcting deficiencies thereby found in said permanent bearings, and facing off the shaft-couplings during the rotation of the shaft in said trued permanent bearings, substantially as set forth.

4. As an improvement in the art of manufacturing crank-shafts, the method of perfecting the alignment and truth of the shaft and its bearings which consists in testing a set of special adjusting-bearings by the application of a cylindrical truing-mandrel, correcting deficiencies thereby found in said special adjusting-bearings, testing the crank-shaft by applying it to said trued adjusting-bearings, testing the permanent bearings of the shaft by the application of the truing-mandrel thereto, correcting deficiencies thereby found in said permanent bearings, testing the crank-shaft by applying to said trued permanent bearings, correcting irregularities in the shaft, again testing the permanent bearings by the application of the truing-mandrel after the bearings have been fastened to the foundation which they occupy when in service and before finally locating the shaft in said bearings, and correcting deficiencies thereby found in said permanent bearings, substantially as set forth.

HORACE SEE.

Witnesses:
J. SNOWDEN BELL,
WILLIAM P. FREEBORN.